(12) United States Patent
Wan et al.

(10) Patent No.: US 9,398,032 B1
(45) Date of Patent: Jul. 19, 2016

(54) APPARATUS AND METHODS FOR DETECTING MALICIOUS SCRIPTS IN WEB PAGES

(75) Inventors: Xiaochuan Wan, Jiangsu (CN); Yongtao Cao, Jiangsu (CN); Xuewen Zhu, Jiangsu (CN); Hua Ye, Jiangsu (CN)

(73) Assignee: Trend Micro Incorporated, Tokyo (JP)

( * ) Notice: Subject to any disclaimer, the term of this patent is extended or adjusted under 35 U.S.C. 154(b) by 1979 days.

(21) Appl. No.: 12/500,412

(22) Filed: Jul. 9, 2009

(51) Int. Cl.
  *G06F 15/16* (2006.01)
  *H04L 29/06* (2006.01)
  *G06F 21/56* (2013.01)

(52) U.S. Cl.
  CPC .......... *H04L 63/1416* (2013.01); *G06F 21/566* (2013.01); *H04L 63/1491* (2013.01)

(58) Field of Classification Search
  CPC ............ H04L 63/1416; H04L 63/1491; G06F 21/566
  USPC ................................. 726/22, 24, 26
  See application file for complete search history.

(56) References Cited

U.S. PATENT DOCUMENTS

| | | | |
|---|---|---|---|
| 6,721,721 B1* | 4/2004 | Bates ..................... | G06F 21/562 |
| 7,343,626 B1 | 3/2008 | Gallagher | |
| 7,398,553 B1 | 7/2008 | Li | |
| 7,472,418 B1 | 12/2008 | McCorkendale et al. | |
| 7,945,563 B2* | 5/2011 | Seitz ............................ | 707/722 |
| 8,079,087 B1* | 12/2011 | Spies et al. ....................... | 726/26 |
| 8,156,541 B1* | 4/2012 | Thomas ............... | H04L 63/1491 726/13 |
| 8,205,258 B1* | 6/2012 | Chang ............... | G06F 17/30684 709/217 |
| 8,505,094 B1* | 8/2013 | Xuewen .............. | H04L 63/1416 707/687 |
| 8,590,039 B1* | 11/2013 | Muttik ................ | H04L 63/1416 726/22 |
| 8,683,584 B1* | 3/2014 | Daswani ............... | G06F 21/577 726/22 |
| 8,903,941 B1* | 12/2014 | Kaul ....................... | G06F 21/54 709/203 |
| 9,032,066 B1* | 5/2015 | Erdmann ................ | G06F 21/53 709/224 |
| 2005/0086499 A1 | 4/2005 | Hoefelmeyer et al. | |
| 2006/0101514 A1* | 5/2006 | Milener et al. ................... | 726/22 |
| 2007/0113282 A1* | 5/2007 | Ross ....................... | G06F 21/52 726/22 |
| 2007/0208822 A1* | 9/2007 | Wang ................... | H04L 63/1416 709/217 |
| 2008/0127338 A1* | 5/2008 | Cho ....................... | G06F 21/566 726/22 |
| 2008/0175266 A1* | 7/2008 | Alperovitch .......... | G06F 21/554 370/465 |
| 2008/0184368 A1* | 7/2008 | Coon ................... | H04L 63/1416 726/23 |
| 2010/0017883 A1* | 1/2010 | Wang ................... | H04L 63/1416 726/26 |
| 2010/0175136 A1* | 7/2010 | Frumer ................... | G06F 21/31 726/26 |
| 2011/0016528 A1* | 1/2011 | Zhou ................... | H04L 41/0677 726/23 |
| 2011/0030060 A1* | 2/2011 | Kejriwal ............... | G06F 21/566 726/25 |
| 2011/0247072 A1* | 10/2011 | Staniford ............ | H04L 63/1416 726/24 |

* cited by examiner

*Primary Examiner* — Krista Zele
*Assistant Examiner* — Anthony Fabbri
(74) *Attorney, Agent, or Firm* — Okamoto & Benedicto LLP

(57) ABSTRACT

One embodiment relates to a computer-implemented method for detecting malicious scripts in web pages. A local engine and an application are executed at a client computer. The local engine intercepts an access by the application to a web page at a universal resource locator (URL) under a domain. The local engine determines scripts at the URL and scripts at other URLs under the domain. Using that information, the local engine determines if the scripts at the URL include one or more unique script(s). The local engine sends the unique script(s), if any, via a network to a script analyzer. The script analyzer may then perform emulation of the unique script(s) to detect malicious code therein. Other embodiments, aspects and features are also disclosed.

14 Claims, 4 Drawing Sheets

400 ns) 106 (e.g., hard

APPARATUS AND METHODS FOR DETECTING MALICIOUS SCRIPTS IN WEB PAGES

BACKGROUND OF THE INVENTION

1. Field of the Invention

The present invention relates generally to computer security, and more particularly, but not necessarily exclusively, to methods and apparatus for detecting malicious computer code.

2. Description of the Background Art

Computer viruses, worms, Trojans, rootkits, and spyware are examples of malicious codes that have plagued computer systems throughout the world. Although there are technical differences between each type of malicious code, malicious codes are also collectively referred to as "viruses." Antivirus products for protecting computers against malicious codes are commercially available. Experienced computer users have installed some form of antivirus in their computers.

A typical antivirus scanner includes a scan engine and a pattern file. The pattern file comprises patterns for identifying known malicious codes. To check a file for malicious code, the scan engine opens the file and compares its content to patterns in the pattern file. While this pattern matching approach is relatively effective, the pattern file needs to be continually updated to address newly discovered malicious codes. As the number of known malicious codes increases, so does the size of the pattern file. The larger the pattern file, the more memory and processing resources are consumed to perform malicious code scanning. Furthermore, a conventional antivirus scanner has limitations in scanning for scripts (for example, java scripts) on web pages, particularly scripts that are encrypted.

An emulator with heuristic rules may be used at the client (host) computer for detecting encrypted scripts. However, such emulation demands a large amount of CPU (central processing unit) and memory resources at the client computer.

SUMMARY

In accordance with one embodiment, a local engine and an application are executed at a client computer. The local engine intercepts an access by the application to a web page at a universal resource locator (URL) under a domain. The local engine determines scripts at the URL and scripts at other URLs under the domain. Using that information, the local engine determines if the scripts at the URL include one or more unique script(s). The local engine sends the unique script(s), if any, via a network to a script analyzer. The script analyzer may then perform emulation of the unique script(s) to detect malicious code therein.

In accordance with another embodiment, a script analyzer receives queries including scripts determined as unique by local engines at a plurality of client computers. The unique scripts are emulated by the script analyzer so as to detect malicious code in scripts are emulated by the script analyzer so as to detect malicious code in the unique script(s). The script analyzer may then respond to the queries by returning results indicating whether or not malicious code was detected.

Other embodiments, aspects and features are also disclosed.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
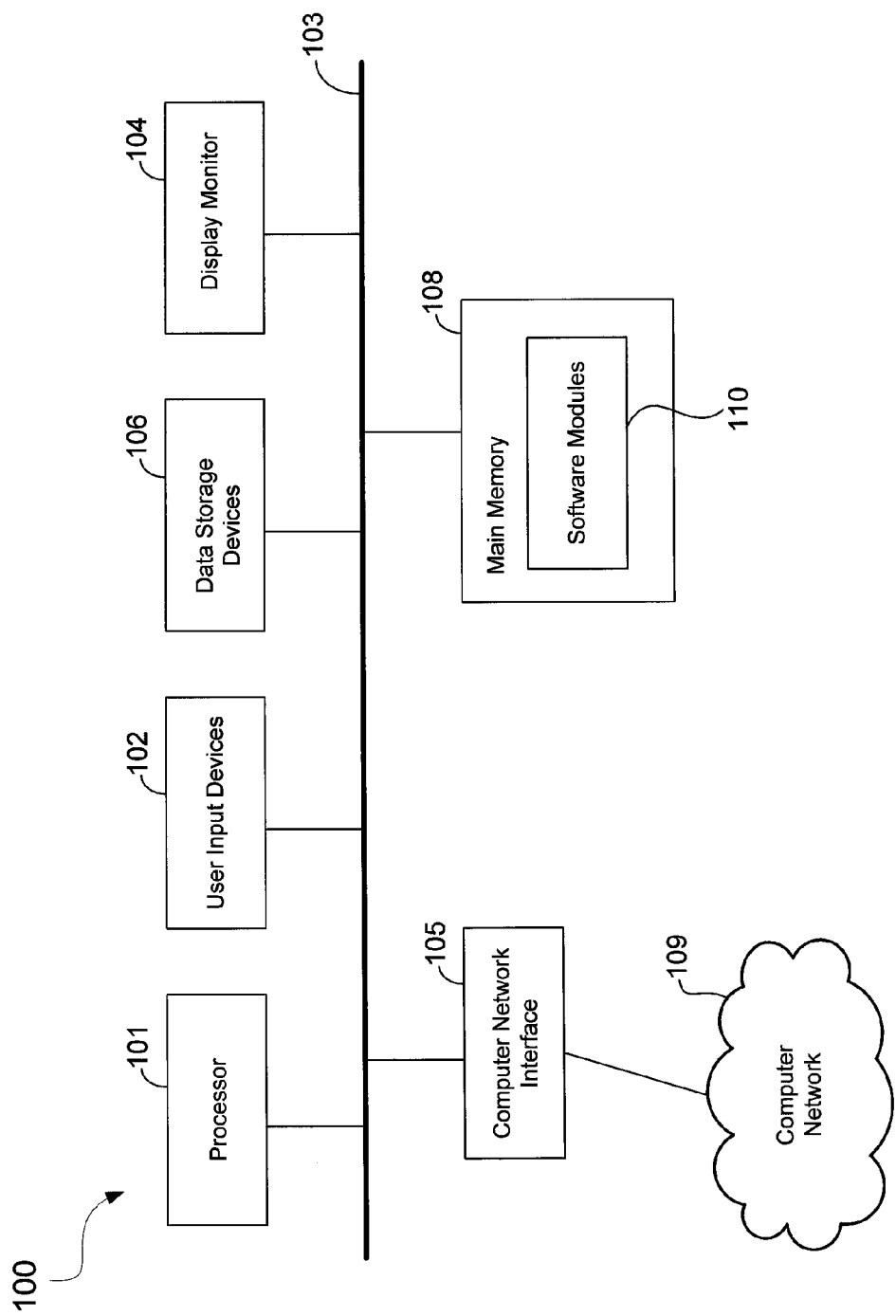
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a client computer 202 or security server computer 204 (see FIG. 2), for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110. The software modules 110 may comprise computer-readable program code (i.e., software) components of a client computer 202 or security server computer 204, for example. The software modules 110 may be loaded from the data storage device 106 to the main memory 108 for execution by the processor 101.

Figure 2:
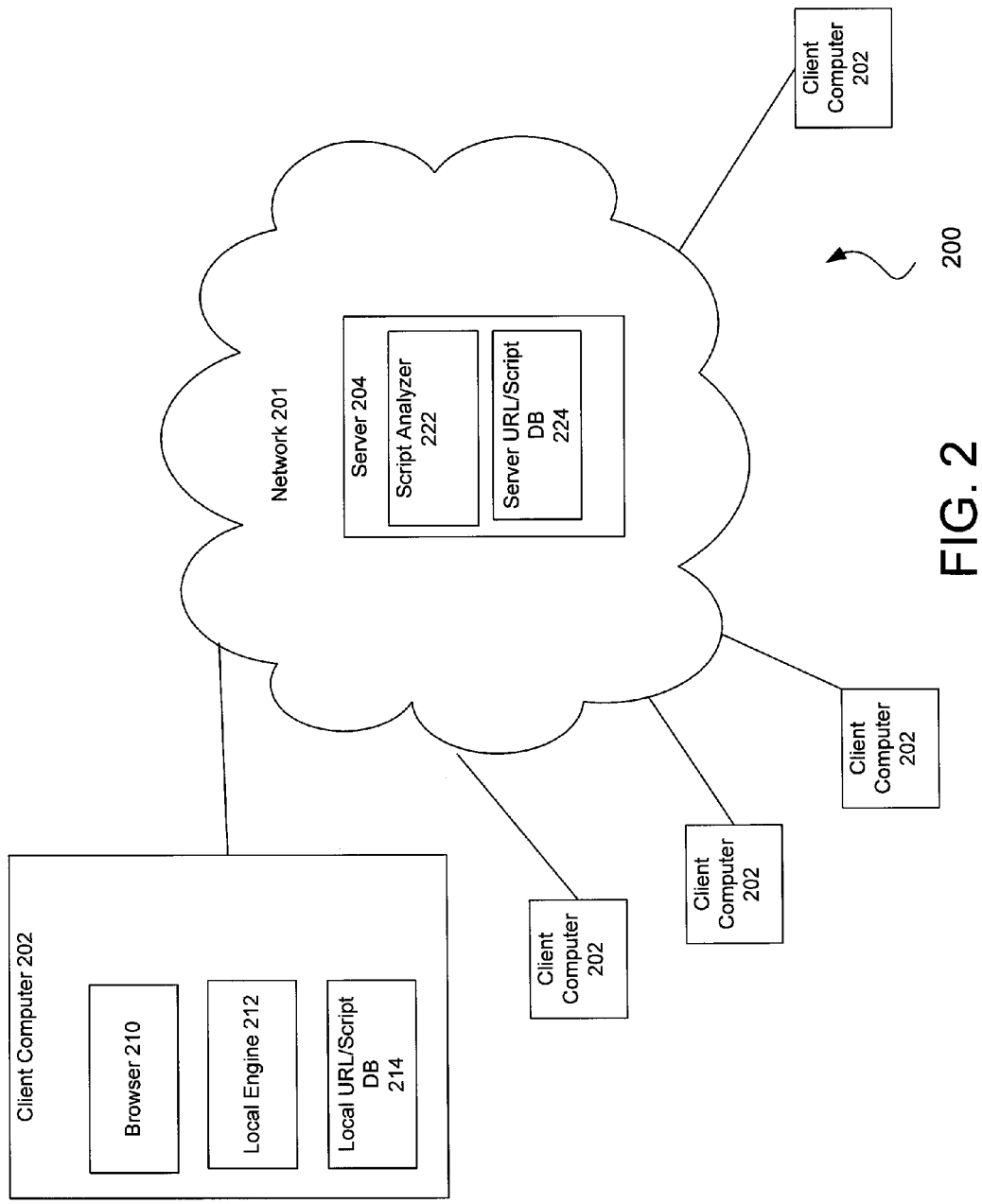
FIG. 2 schematically shows an apparatus for detecting malicious scripts in web pages in accordance with an embodiment of the present invention.

FIG. 2 schematically shows an apparatus 200 for scanning web pages for malicious scripts in accordance with an embodiment of the invention. In the example of FIG. 2, the apparatus 200 includes multiple client computers ("clients") 202 and one or more server computers ("servers") 204. As shown, the server 204 may be part of a network (or network "cloud") 201. The clients 202 may communicate with the server 204 by way of the network 201.

Select components in a client 202 and in a server 204 are shown. As shown, the client 202 may include, among other components, a web browser ("browser") 210, a local engine 212, and a local URL/script database (DB) 214. The local engine 212 may be implemented as one or more executable software programs. The operation of the local engine 212 is described further below in relation to the flow chart of FIG. 3.

As further shown, the server 204 may include, among other components, a script analyzer 222 and a server URL/script database (DB) 224. In accordance with an embodiment of the invention, the script analyzer 222 may be computer-readable program code which is configured to be executed by a server computer (server) 204. The script analyzer 222 may also be a virtualized resource which is accessible as a service by way of a network or network "cloud" 201. The operation of the script analyzer 222 is described further below in relation to the flow chart of FIG. 4.

Figure 3:
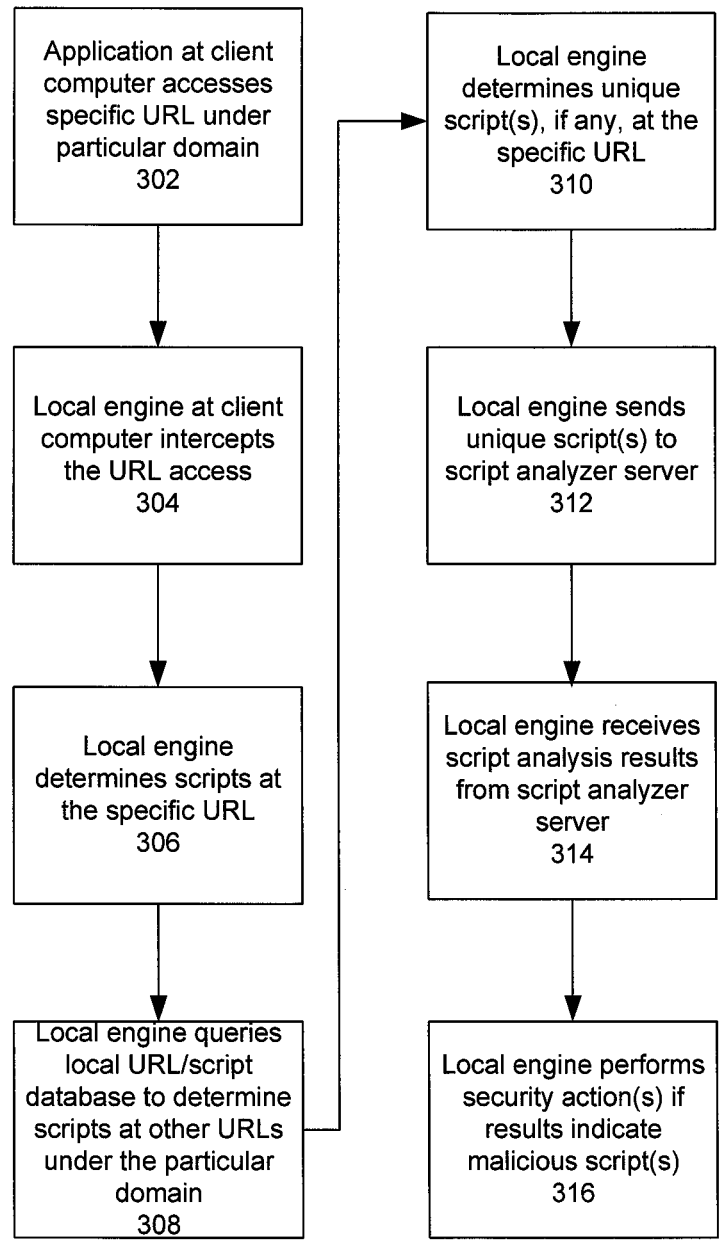
FIG. 3 is a flow chart of a method performed by a client computer in accordance with an embodiment of the present invention.

FIG. 3 is a flow chart of a method 300 performed by a client computer 202 in accordance with an embodiment of the present invention. This method 300 provides a particularly advantageous technique for detecting malicious scripts in web pages.

As shown, a computer application, such as a browser 210, at the client 202 accesses 302 a specific URL (universal resource locator) under a particular domain. For example, a browser 210 may access hypothetical URL http://www.x-.com/dir1/1.htm. (Note that, per MPEP §608.01, URLs in this application are not intended to be active hyperlinks.) In accordance with an embodiment of the invention, this URL access by the application is intercepted 304 by the local engine 212 at the client 202.

The local engine 212 determines 306 the scripts at the specific URL. In particular, the scripts may be determined by scanning the source code (html code) of the web page at the specified URL. Per the above example with the hypothetical URL, the local engine 212 may determine that the specific URL has the following three scripts associated with it: 0_0.js; 1_0.js; and 1_1.js.

In addition to determining the scripts associated with the specific URL, the local engine 212 may query 308 the local URL/script database 214 to determine scripts at other URLs under the same domain. In accordance with an embodiment of the invention, the local URL/script database 214 is previously populated with a limited set of popular URLs and the scripts at those popular URLs. Per the above example with the hypothetical URL, the local URL/script database 214 may respond to the query with information indicating that the following scripts are at the following URLs under the same domain as the specific URL.

| URL | Script(s) |
| --- | --- |
| http://www.x.com/ | 0_0.js |
| http://www.x.com/dir1/ | 0_0.js; 1_0.js |
| http://www.x.com/dir1/5.htm | 0_0.js; 1_0.js; 1_5.js |

From the scripts at the specific URL and the scripts at other URLs under the same domain, the local engine 212 may then determine 310 which of the scripts at the specific URL are unique, if any. Per the above example with the hypothetical URL, the local engine 212 may determine 310 that the script 1_1.js is unique to the specific URL http://www.x.com/dir1/1.htm in that it is not known (from the reply of the local URL/script DB 214) to be at any other URL under the same domain.

The local engine 212 may then send 312 any unique script(s) found to a script analyzer 222. In one embodiment, the local engine 212 may compress (pack) the script before sending it. In another embodiment, the local engine 212 may send the location of the script (the URL of the script).

The local engine 212 receives 314 the script analysis results returned by the script analyzer 222 via a response to the local engine's query 308. The response may indicate, for example, that one or more of the submitted scripts contains malicious code, or that none of the submitted scripts contain malicious code.

If the results indicate that one or more of the submitted scripts contains malicious code, then the local engine 212 may perform 316 one or more security actions(s). For example, the security action(s) may involve blocking the execution of the script(s) with malicious code. A message may also be displayed to notify the user of the malicious script(s). A user and/or administrator may also be notified (for example, by displaying a message on a monitor) that malicious code in the unique script at the specific URL has been detected.

Figure 4:
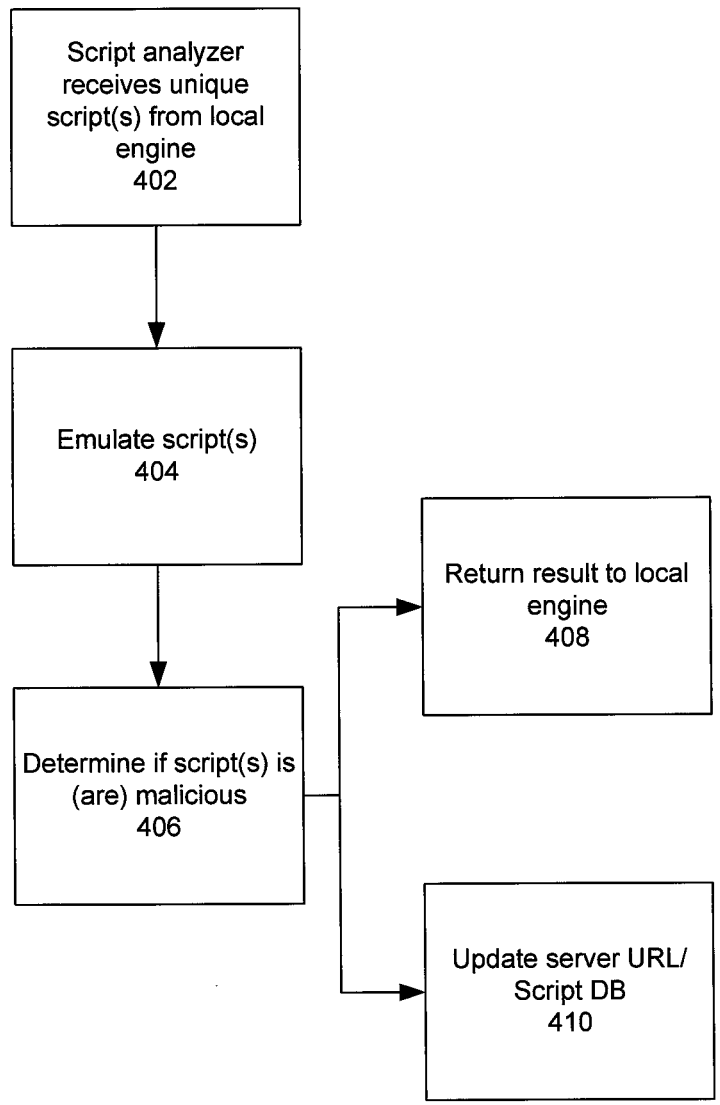
FIG. 4 is a flow chart of a method performed by a script analyzer in accordance with an embodiment of the present invention.

FIG. 4 is a flow chart of a method performed by a script analyzer 222 in accordance with an embodiment of the present invention. As described above, the script analyzer 222 may receive 402 a query including one or more unique script(s) from a local engine 212 at a client computer 202. If the unique script(s) are received in compressed (packed) form, then the script analyzer 222 uncompresses (unpacks) the script(s). If the location(s) of the unique script(s) are received, then the script analyzer 222 retrieves the script(s) from the location(s).

The script analyzer 222 then emulates 404 the unique script(s). For example, the emulation may be performed in a "sandbox" to safely determine 406 if the script(s) include malicious code. If a portion of a script being emulated is encrypted, then the script may decrypt that portion during the emulation. Malicious action(s) performed by the script(s) during emulation would indicate the presence of malicious code.

In one embodiment of the invention, the emulation 404 performed by the script analyzer 222 may be prioritized depending on characteristics of the scripts submitted by the local engines 212 at the various clients 202. For example, a newly inserted script in a previously scanned URL (indicating a script change at that URL) may have a higher priority for emulation 404 by the script analyzer 222.

The script analyzer 222 may then return 408 the results of the script analysis to the local engine 212 which sent the query. The results may indicate, for example, that a script contains malicious code, or that the script appears to be benign. If malicious code is indicated, then the results may also indicate the type of the malicious code or otherwise identify the malicious code.

In addition, the server URL/script DB 224 may be updated 410. In one embodiment, such updating 410 of the server URL/script DB 224 may occur periodically. The local URL/script DBs 214 at client computers 222 may be partly synchronized with the server URL/script DB 224. Various techniques may be used to achieve the partial synchronization.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method for detecting malicious scripts in web pages, the method comprising:
   executing a local engine at a client computer;
   executing an application at the client computer;
   intercepting by the local engine an access by the application to a web page at a universal resource locator (URL) under a domain;
   determining by the local engine scripts at the URL;
   determining by the local engine scripts at other URLs under the domain;
   determining by the local engine whether the scripts at the URL include a unique script which is at the URL but not at the other URLs under the domain; and
   sending by the local engine the unique script via a network to a script analyzer.

2. The method of claim 1, wherein the local engine queries a local database to determine the scripts at other URLs under the domain.

3. The method of claim 1, further comprising:
   compressing the unique script by the local engine prior to sending the unique script via the network to the script analyzer.

4. The method of claim 1, wherein sending the unique script via the network to the script analyzer comprises sending a location of the unique script and not sending the unique script itself.

5. The method of claim 1, further comprising:
   receiving script analysis results via the network from the script analyzer; and
   performing a security action if the results indicate presence of malicious code in the unique script.

6. The method of claim 5, wherein the security action comprises blocking execution of the unique script with the malicious code.

7. The method of claim 5, wherein the security action comprises notifying a user or administrator that the malicious code in the unique script at a specific URL has been detected.

8. A computer apparatus comprising:
   computer-readable code configured as a local engine at a client computer;
   computer-readable code configured as an application at the client computer;
   computer-readable code of the local engine configured to intercept an access by the application to a web page at a universal resource locator (URL) under a domain;
   computer-readable code of the local engine configured to determine scripts at the URL;
   computer-readable code of the local engine configured to determine scripts at other URLs under the domain;
   computer-readable code of the local engine configured to determine whether the scripts at the URL include a unique script which is at the URL but not at the other URLs under the domain; and
   computer-readable code of the local engine configured to send the unique script via a network to a script analyzer;
   data storage and memory configured to store said computer-readable codes and other computer-readable data; and
   a processor configured to execute said stored computer-readable codes.

9. The apparatus of claim 8, further comprising:
   a local database at the computer apparatus; and
   wherein said computer-readable code of the local engine is configured to query the local database to determine the scripts at other URLs under the domain.

10. The apparatus of claim 8, further comprising:
    wherein said computer-readable code of the local engine is configured to compress the unique script prior to sending the unique script via the network to the script analyzer.

11. The apparatus of claim 8, wherein sending the unique script via the network to the script analyzer comprises sending a location of the unique script and not sending the unique script itself.

12. The apparatus of claim 8, further comprising:
    wherein said computer-readable code of the local engine is configured to receive script analysis results via the network from the script analyzer; and
    said computer-readable code of the local engine is configured to perform a security action if the results indicate presence of malicious code in the unique script.

13. The apparatus of claim 12, wherein the security action comprises blocking execution of the unique script with the malicious code.

14. The apparatus of claim 12, wherein the security action comprises notifying a user or administrator that the malicious code in the unique script at the specific URL has been detected.

* * * * *